(12) United States Patent  (10) Patent No.: US 8,588,603 B2
Nishiwaki  (45) Date of Patent: Nov. 19, 2013

(54) IMAGING APPARATUS (75) Inventor: Kenya Nishiwaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/306,262

(22) Filed: Nov. 29, 2011

(65) Prior Publication Data

US 2012/0148226 A1 Jun. 14, 2012

(30) Foreign Application Priority Data

Dec. 10, 2010 (JP) .................................. 2010-276193

(51) Int. Cl.
G03B 15/06 (2006.01)
G03B 15/03 (2006.01)
(52) U.S. Cl.
USPC ......................................................... 396/177
(58) Field of Classification Search
USPC ................................................. 396/176–178
See application file for complete search history.

(56) References Cited

U.S. PATENT DOCUMENTS

2004/0161230 A1* 8/2004 Hosokawa et al. ........... 396/177

FOREIGN PATENT DOCUMENTS

JP 62-121428 6/1987
JP 07-199295 8/1995

* cited by examiner

Primary Examiner — Clayton E Laballe
Assistant Examiner — Noam Reisner
(74) Attorney, Agent, or Firm — Cowan, Liebowitz & Latman, P.C.

(57) ABSTRACT

When an automatic pop-up is selected in an imaging apparatus, during startup, a light emission unit is moved to a pop-up position by a spring force in operably conjugate with a lens barrel together with the retraction of a cam follower. When a manual pop-up is selected, during startup, a lock lever is engaged with the light emission unit, and the light emission unit remains in a storage position. When a user places the operation unit of the lock lever to a first position and places the camera power source in the ON position, a strobe can be automatically subjected to a pop-up operation. Furthermore, when a user places the operation unit to a second position and places the camera power source in the ON position, the strobe can be automatically subjected to a pop-up operation as required.

5 Claims, 7 Drawing Sheets

X DIRECTION ⟷ −X DIRECTION

IMAGING APPARATUS

BACKGROUND OF THE INVENTION

1. Field of the Invention

The present invention relates to a pop-up strobe apparatus provided on a camera.

2. Description of the Related Art

A strobe is provided on a corner of a camera housing to supplement the light to an object to be imaged in the dark. Mounting of a pop-up strobe for popping-up the strobe light emission unit is known particularly in relation to a small camera that includes a lens barrel that is large relative to the housing. This configuration is adapted to prevent a "shading" phenomenon in which the strobe light does not reach the object due to shading by the leading end of the lens barrel.

The apparatus disclosed in Japanese Patent Application Laid-Open No. 7-199295 is configured so that the strobe light emission unit is raised above the camera in operable conjugation with the projection of the lens barrel forward of the camera when the camera is placed in the ON position. To avoid missing a photo opportunity, the strobe is constantly in a light emission position since the strobe is constantly in a pop-up state during imaging.

The apparatus disclosed in Japanese Patent Application Laid-Open No. 62-121428 includes a mechanism that is configured to lock the light emission unit with a manual or electrical locking mechanism and release the lock as required to execute a pop-up operation using a spring force. Inconvenience can be avoided since a user only executes the pop-up operation for the light emission unit when required and storage after completion of imaging is possible. Consequently, the light emission unit in a pop-up state can be prevented from being subjected to unintended shocks or external pressure.

The strobe of the apparatus disclosed in Japanese Patent Application Laid-Open No. 7-199295 is constantly in a pop-up state during imaging and therefore imaging is impeded when the strobe is not required, and there is a risk of the strobe light emission unit being subjected to unintended shocks or external pressure. Furthermore, unnecessary power consumption is caused from the requirement for constant charging of the light-emitting capacitor to adapt to unexpected photo opportunities. In addition, there is a risk of the user experiencing a situation in a location such as an art gallery where strobe photography is prohibited due to use of the apparatus being prohibited as a result of a misunderstanding that the strobe which is in a pop-up state will emit light. Furthermore, although a strobe emits light for an extremely short period toward an object in the dark, since it is exclusively limited to still-image photography and is not required during moving-image photography, an impediment is caused during moving-image photography since the apparatus remains in a pop-up state.

The apparatus disclosed in Japanese Patent Application Laid-Open No. 62-121428 may result in a risk of missing a photo opportunity due to trouble to a user during a pop-up operation. Furthermore, there is a need to minimize impact noise during the pop-up operation and, during adjustment of the autofocus (AF), to avoid any deviation or the like caused by the impact.

As described above, both the above pop-up ways include advantages and disadvantages, and the two ways should preferably be used in response to user preferences or imaging conditions.

SUMMARY OF THE INVENTION

According to an imaging apparatus of the present invention, when the imaging apparatus changes from a state in which imaging is not enabled to a state in which imaging is enabled, a switching operation is executed to automatically move a light emission unit to a pop-up position or maintain the light emission unit in a storage position.

The imaging apparatus of an aspect of the present invention includes a light emission unit and a pop-up mechanism configured to move the light emission unit between a storage position at which the light emission unit is stored in the imaging apparatus body and a pop-up position in which the light emission unit protrudes in relation to the imaging apparatus body. The pop-up mechanism includes a moving member configured to move when the imaging apparatus changes from a state in which imaging is not enabled to a state in which imaging is enabled, a link member configured to move in operably conjugate with the moving member, and a switching member configured to switch the link member to a state in which the link member operably link with the moving member and a state in which the link member does not operably link with the moving member. When the switching member switches the link member to a state in which the link member operably link with the moving member, the light emission unit moves from the storage position to the pop-up position when the imaging apparatus changes from a state in which imaging is not enabled to a state in which imaging is enabled. When the switching member switches the link member to a state in which the link member does not operably link with the moving member, the light emission unit is maintained at the storage position when the imaging apparatus changes from a state in which imaging is not enabled to a state in which imaging is enabled. After the imaging apparatus changes to a state in which imaging is enabled in a state in which the light emission unit is maintained at the storage position, the light emission unit moves from the storage position to the pop-up position as a result of the switching member switching to a state in which the link member operably link with the moving member.

Further features of the present invention will become apparent from the following description of exemplary embodiments with reference to the attached drawings.

BRIEF DESCRIPTION OF THE EMBODIMENTS

Figure 1:
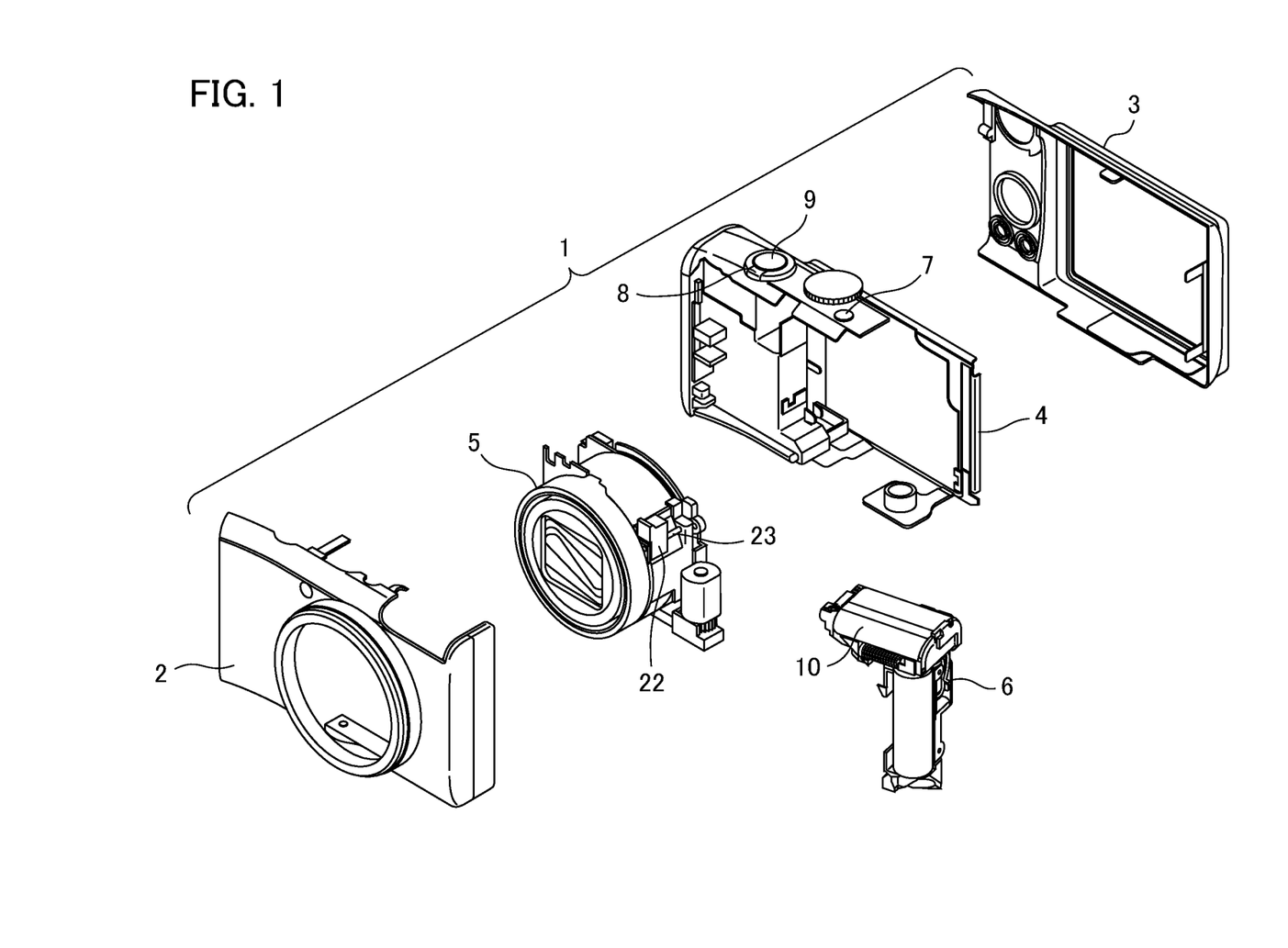
FIG. 1 is a partial perspective view illustrating a configuration example of an imaging apparatus according to an exemplary embodiment of the present invention.
Figure 2A:
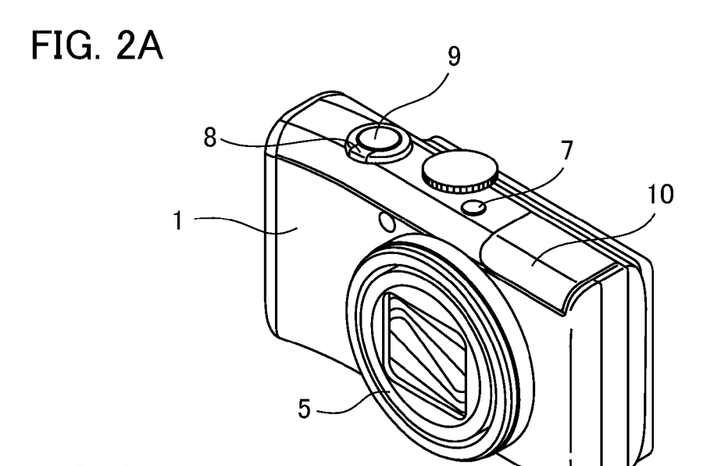
FIG. 2A to FIG. 2C is a perspective view when the imaging apparatus illustrated in FIG. 1 is viewed from the front.
Figure 2B:
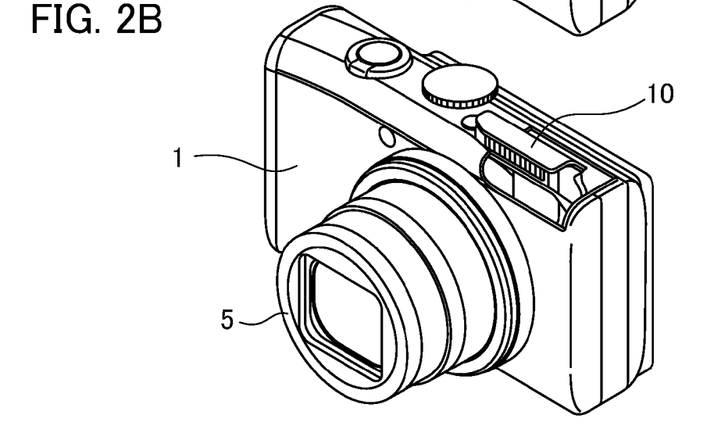
Figure 2C:
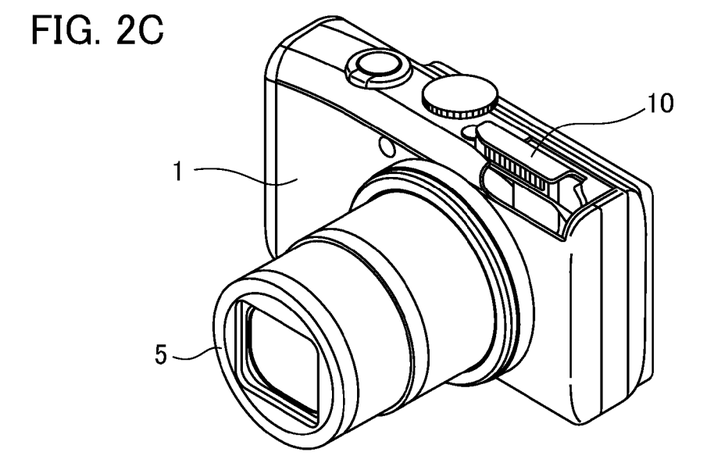

The preferred embodiment for execution of the present invention will be described below with reference to the figures. FIG. 1 illustrates a configuration of an imaging apparatus according to an exemplary embodiment. FIG. 2A to FIG. 2C illustrate three states of the imaging apparatus.

A front cover 2 and a rear cover 3 of an imaging apparatus main body 1 are mounted on a base 4, and the main body 1 includes a lens barrel unit 5 and a strobe unit 6. When a main switch 7 provided on the upper surface of the imaging apparatus main body 1 is in the OFF state, the lens barrel unit 5 is retracted and stored in the imaging apparatus main body 1 as illustrated in FIG. 2A, and is a state in which imaging is not enabled. When the main switch 7 is changed in the ON state, the camera power source is ON, the lens barrel unit 5 protrudes from the imaging apparatus main body 1 to the wide angle position, and has a state in which imaging is enabled as illustrated in FIG. 2B. When a zoom lever 8 is operated during imaging, the lens barrel unit 5 protrudes to the telephoto angle position as illustrated in FIG. 2C, and during that period, the imaging angle of view can be adjusted. When the user operates a release button 9, an imaging operation is commenced.

The strobe unit 6 is disposed on the imaging apparatus main body 1 opposite the release button 9. This configuration prevents covering of a light emission unit 10 by the hand when the imaging apparatus main body 1 is gripped by the right hand of a user during an imaging operation. In FIG. 2A that illustrates the main switch 7 in the OFF state, the light emission unit 10 is in the state so as to be stored in the imaging apparatus main body 1. When the main switch 7 is changed in an ON state in a pop-up state during start-up, the light emission unit 10 is operably linked with the protrusion of the lens barrel unit 5 and undergoes a pop-up operation from the apparatus main body 1 to be configured as illustrated in FIG. 2B.

Figure 3A:
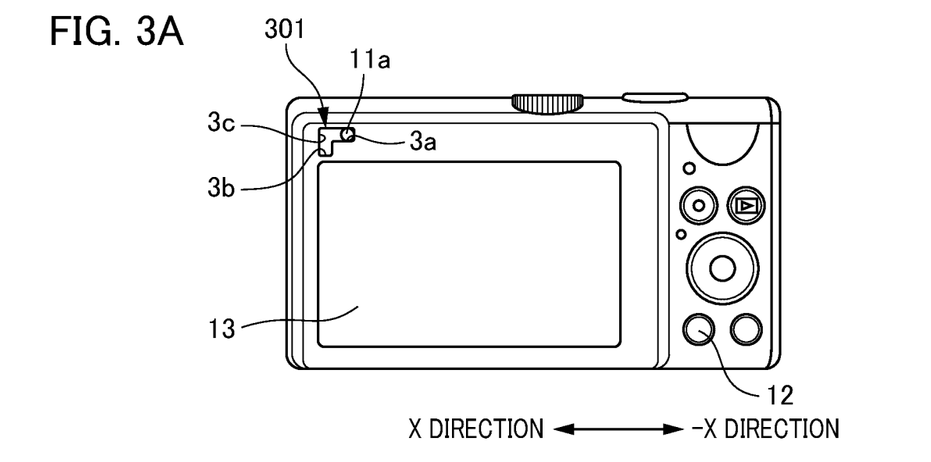
FIG. 3A to FIG. 3C illustrate the operating unit of the lock lever.
Figure 3B:
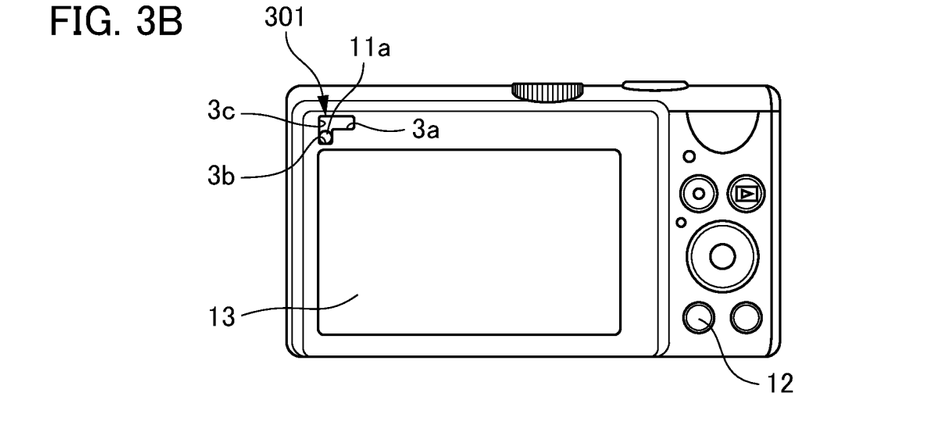
Figure 3C:
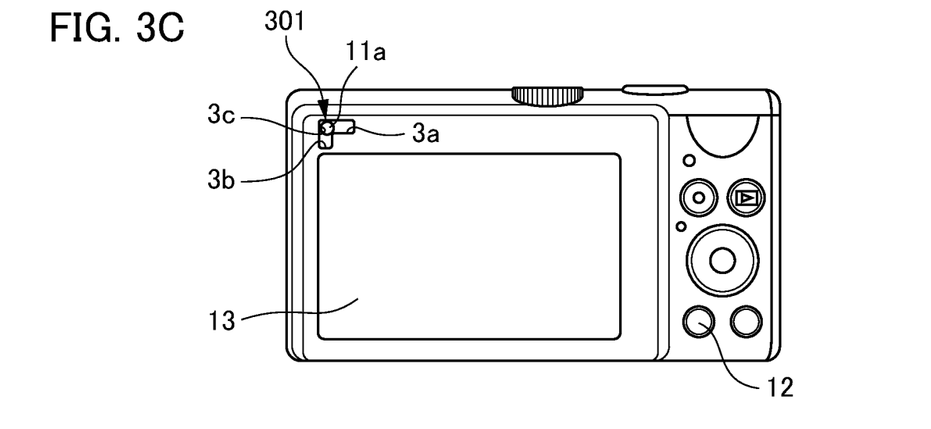

FIG. 3A to FIG. 3C are rear views of the imaging apparatus main body 1. The lock lever 11 is positioned to the upper left of an image display unit 13, and the related operation unit 11a protrudes from an aperture portion 301 formed in the rear cover 3 of the imaging apparatus main body 1 for operation thereof by a user. The operation unit 11a can be set in three positions. The aperture portion 301 forms a letter "L", and as illustrated in FIG. 3A, the operation unit 11a of the lock level 11 is positioned in a first position 3a on the right end of the aperture portion 301. FIG. 3B illustrates the operation unit 11a in a second position 3b inclined from the left end of the aperture portion 301, and FIG. 3C illustrates the operation unit 11a in a third position 3c raised from the second position 3b. The direction X in the figures indicates the left direction and the –X direction illustrates the right direction viewed from the rear surface of the imaging apparatus main body 1.

As illustrated in FIG. 3A, when a user moves the operation unit 11a in the direction X to the first position 3a, the light emission unit 10 is operably linked with the camera power source, which is switched to the ON position, and undergoes a pop-up operation, and the light emission unit 10 is operably linked with the camera power source, which is switched to the OFF position, and is automatically stored. In the following description, the first position 3a will be termed an automatic pop-up position. Furthermore as illustrated in FIG. 3B, when a user operates the operation unit 3a to the second position 3b, there is no operable linkage with the camera power source switched to the ON position, and the light emission unit 10 does not undergo a pop-up operation. The second position 3b is termed a manual pop-up down position. When a pop-up operation of the light emission unit 10 is required, a user moves the operation unit 11a to the third position 3c. This position is termed the manual pop-up up position. When the operation unit 11a is set to the manual pop-up up position, the light emission unit 10 undergoes a pop-up operation from the imaging apparatus main body 1.

A mode switching button 12 that functions as a mode switching means is provided on the right side of the image display unit 13 on the rear surface of the imaging apparatus main body 1 to thereby enable setting of an imaging mode by a user. When a still-image photography mode is set by operation of the mode switching button 12, a single still image is captured when the release button 9 is pressed. Conversely, when a moving-image photography mode is selected, moving-image photography is enabled. Furthermore, a user may select a strobe linkage mode. The strobe link mode is a mode in which the setting of the imaging mode is switched temporarily by operable linkage by the operation of the operating unit 11a and not by operation of the mode switching button 12. The selected imaging mode is displayed by an icon on a portion of the display screen of the image display unit 13 to therefore enable confirmation by a user during imaging.

Figure 4:
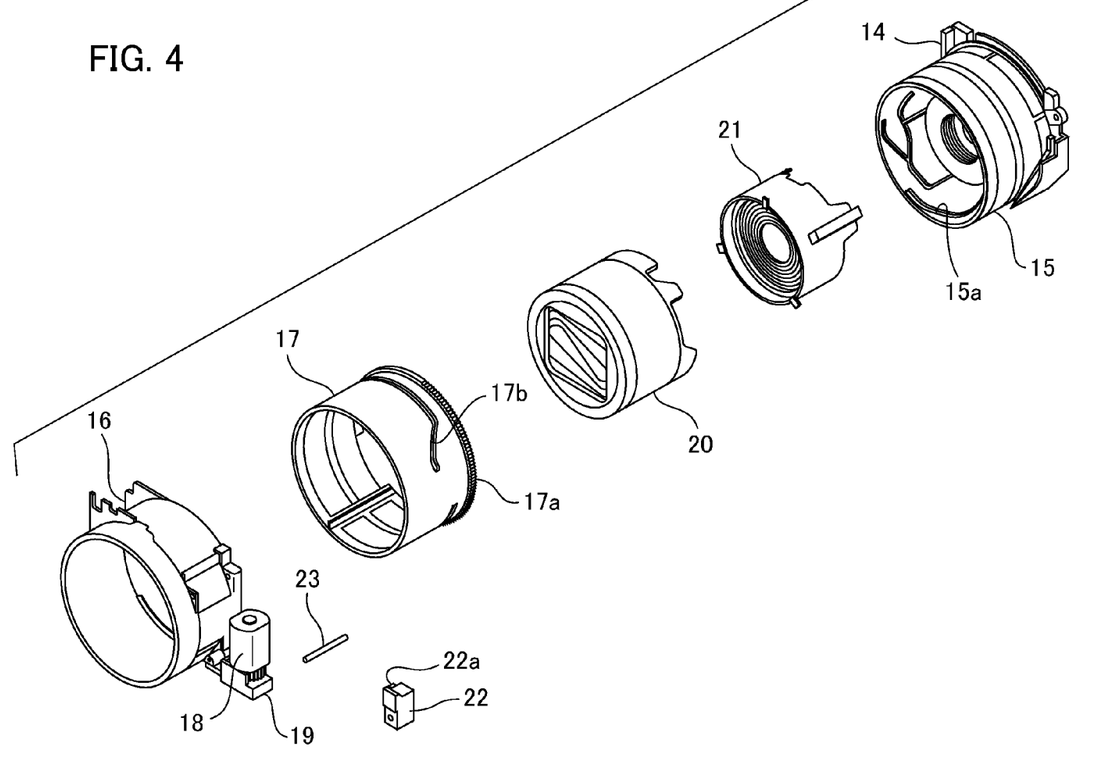
FIG. 4 is a partial perspective view of the lens barrel unit.
Figure 5:
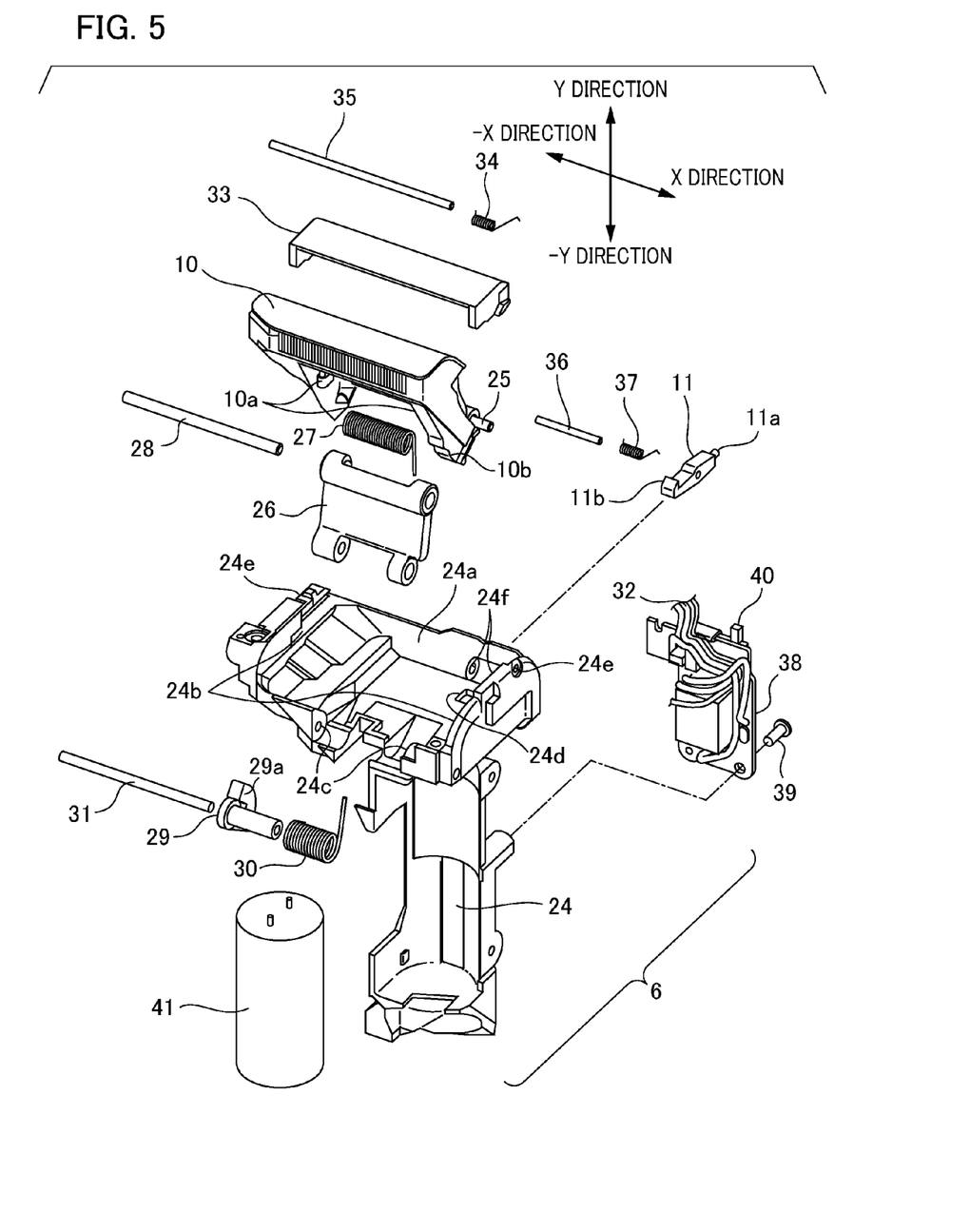
FIG. 5 is a partial perspective view of the strobe unit.

Next, the configuration of the pop-up mechanism of the strobe unit 6 will be described. FIG. 4 is a partial perspective view of the lens barrel unit 5. FIG. 5 is a partial perspective view of the strobe unit 6.

As illustrated in FIG. 4, the lens barrel unit 5 includes a stationary tube 15 mounted on a holder 14 and a lens barrel cover 16 covering an outer side thereof to thereby configure the basic structural body. A cylindrical drive ring 17 rotates the outer periphery of the stationary tube 15. A gear unit 17a is formed on an outer peripheral surface of the drive ring 17, the gear unit 17a is driven by a motor 18 via a gear series 19 to thereby rotate the drive ring 17 about the optical axis. A cam groove 15a is provided on an inner peripheral portion of the stationary tube 15, and the first lens barrel 20 and the second lens barrel 21 are moved with respect to the optical axis in accordance with the cam groove 15a. That is to say, when the power source is in the OFF position, the first lens barrel 20 and the second lens barrel 21 are positioned at the storage position (refer to FIG. 2A) housed in the lens barrel cover 16. Then, when the power source is in the ON position, the first lens barrel 20 and the second lens barrel 21 protrude to the wide angle position (refer to FIG. 2B). Thereafter, the user operates the zoom lever 8 to thereby stop the first lens barrel 20 and the second lens barrel 21 at an arbitrary position between the wide angle position and the telephoto angle position (refer to FIG. 2C).

The members that are involved with the operation of the pop-up mechanism are the cam follower 22 and the related guide shaft 23. The cam follower 22 is a moving member that is engaged with the drive ring 17 to thereby move in a direction parallel to the optical axis together with the rotation of the drive ring, and that moves along the guide shaft 23 mounted on the lens barrel cover 16. A guide pin 22a provided on the cam follower 22 is engaged in the cam groove 17b of the drive ring 17 and moves along a direction parallel to the optical axis along the guide shaft 23 in response to the rotation of the drive ring 17, that is to say, along the longitudinal direction (the object being the front) of the imaging apparatus. The shape of the cam groove 17b of the drive ring 17 is regulated as described hereafter. When the drive ring 17 is in the storage position, the cam follower 22 is positioned at the forward-most end of the moving range. Furthermore, when the drive ring 17 is at the wide angle position, the cam follower 22 is positioned at the rearward-most end of the moving range. When the drive ring 17 is positioned between the wide angle position and the telephoto angle position, the cam follower 22 does not move and remains positioned at the rear-most end of the moving range. In this manner, although the cam follower 22 moves in response to the action of the drive ring 17 moving from the storage position to the wide angle position, a configuration is provided so that there is no movement in the interval from the wide angle position up to the telephoto angle position. Precise description will be given in detail hereafter making reference to FIG. 6 and FIG. 7.

Next, the configuration of the strobe unit 6 will be described making reference to FIG. 5. In the strobe unit 6, the cam follower 22 is operably linked to retract from the forward-most end to the rearward-most end of the moving range to thereby move the light emission unit 10 from the storage position to the pop-up position. Furthermore, the cam follower 22 is operably linked to move from the rearward-most end to the forward-most end of the moving range to thereby return the light emission unit 10 to the storage position.

Firstly, the strobe base 24 that is the basic portion of the strobe unit 6 will be described. A storage unit 24a formed on an upper portion of the strobe base 24 stores the light emission unit 10. A pair of guides 24b is respectively formed on both side surfaces of the storage unit 24a to thereby slide and guide a slide shaft 25 of the light emission unit 10. A pair of bearings 10a is provided on the light emission unit 10, and a link 26 is mounted using a first spring 27 and a first shaft 28. Since the first spring 27 is attached to one end portion of the link 26, and both end portions are fitted to the bearing 10a in a state in which the first shaft 28 passes through those components, the link 26 rotates freely with respect to the light emission unit 10.

The link 26 is mounted on a pair of bearings 24c provided on the strobe base 24 using a link lever 29, a second spring 30, and a second shaft 31. Since the link lever 29 with the second spring 30 is mounted on the link 26 by use of the second shaft 31, the link lever 29 rotates freely with respect to the link 26. A stopper 29a is formed on the link lever 29, and abuts with the receiving surface 26a of the link 26 (refer to FIG. 6). The link lever 29 is a link member that can move in operably conjugation with the cam follower 22. The second spring 30 has a greater linear diameter than the first spring and is manufactured from a material that has a high permissible stress and is designed to obtain a higher spring force. These springs are biased in a direction in which the light emission unit 10 protrudes from the apparatus main body.

A lead line insertion port 24d formed on the strobe base 24 is fixed by insertion of a plurality of lead lines 32, and passes below the storage unit 24a. The plurality of lead lines 32 is wound from the light emission unit 10 and drawn from the lead line insertion port 24d out of the storage unit 24a.

A pair of bearing units 24e is formed on the strobe base 24, and a light emission unit cover 33 is mounted by use of a cover spring 34 and a cover shaft 35. The light emission unit cover 33 is a member that covers the light emission unit 10 from the outer side, and is mounted to rotate freely together with the cover spring 34 on the pair of bearing units 24e by the cover shaft 35. The cover spring 34 constantly biases the light emission unit cover 33 in a closure direction.

A pair of bearings 24f is formed on the strobe base 24, and the lock lever 11 described above is mounted by use of a shaft 36 and a lock spring 37. The lock lever 11 is an engaging member enabling engagement of the recessed portion 10b formed on the light emission unit 10. Since the lock lever 11 is mounted through the shaft 36 on the pair of bearings 24f, the lock lever 11 moves along the shaft 36 in the X direction and the −X direction in FIG. 5. The lock lever 11 rotates about the shaft 36 and thereby the operation unit 11a moves in the Y direction in FIG. 5. In the same manner as the description in relation to FIG. 3A to FIG. 3C, the operation unit 11a of the lock lever 11 protrudes outwardly from the L-shaped aperture portion 301 provided on the rear cover 3 to thereby enable operation by a user (refer to position 3a to 3c). As illustrated in FIG. 3A, when the operation unit 11a moves in the X direction and is set to the first position 3a (automatic pop-up position), since the operation unit 11a is restricted by the aperture portion 301, movement is not enabled in the Y direction or the −Y direction, and movement is only enabled in the X direction. Furthermore, when the operation unit 11a is set to the second position 3b as illustrated in FIG. 3B (manual pop-up down position), the operation unit 11a can move in the Y direction along the aperture portion 301. That is to say, a user can operate the operation unit 11a to thereby enable variation of the operation position in the Y direction and the −Y direction between the second position 3b and the third position 3c.

When the operation unit 11a is moved from the first position 3a illustrated in FIG. 3A (automatic pop-up position) in the X direction, the operation unit 11a is positioned at the third position 3c (manual pop-up up position) illustrated in FIG. 3C. A lock spring 37 is provided as a biasing member to bias the lock lever 11 so that the operation unit 11a moves to the second position 3b (manual pop-up down position). Furthermore, when the operation unit 11a is positioned at the second position 3b, a hook portion 11b of the lock lever 11 is engaged with a recessed portion 10b formed on the light emission unit 10. That is to say, when a user moves the operation unit 11a from the first position 3a illustrated in FIG. 3A (automatic pop-up position) in the X direction to the third position 3c (manual pop-up up position), the lock lever 11 is rotated by the biasing force of the lock spring 37. When the lock lever 11 rotates, the operation unit 11a moves from the third position 3c illustrated in FIG. 3C (manual pop-up up position) in the −Y direction to the second position 3b (manual pop-up down position). When the operation unit 11a is positioned at the second position 3b (manual pop-up down position), the hook portion 11b is engaged with the recessed portion 10b. When a user moves the operation unit 11a from the second position 3b (manual pop-up down position) illustrated in FIG. 3A (automatic pop-up position) in the Y direction to the third position 3c (manual pop-up up position), the lock lever 11 is rotated about the axis 36, and releases the engagement of the hook portion 11b and the recessed portion 10b. When a user moves the operation unit 11a from the third position 3c (manual pop-up up position) in the −X direction to the first position 3a illustrated in FIG. 3A (automatic pop-up position), the hook portion 11b is maintained in a state of non-engagement with the recessed portion 10b.

The strobe base plate 38 is fixed with a screw 39 to the strobe base 24, and the plurality of lead lines 32 drawn from the lead line insertion portion 24d is connected. A detection switch 40 is mounted on the strobe base plate 38 as a detection means for detecting the operational state of the lock lever 11. That is to say, as illustrated in FIG. 3A, when the user moves the operation unit 11a to the first position 3a (automatic pop-up position), the lock lever 11 places the detection switch 40 in the ON position. Therefore, the operation unit 11a is detected as in a setting at the first position 3a (automatic pop-up position). Furthermore, as illustrated in FIG. 3B and FIG. 3C, when the user moves the operation unit 11a to the second position 3b (manual pop-up down position) and the third position 3c (manual pop-up up position), the lock lever 11 does not place the detection switch 40 in the ON position. In this manner, the operation unit 11a is detected as not in a setting at the automatic pop-up position. The detection result is sent to the camera system control unit (not shown), and is reflected in the imaging mode when the user presses the main switch to startup the camera. In other words, when "strobe linkage mode" is selected by the mode switching button 12, the camera is started up in the following modes.

"Still-image photography mode", when the operation unit 11a is at the first position 3a (automatic pop-up position) (a mode in which a single still image is captured when the release button 9 is pressed).

"Moving-image photography mode", when the operation unit 11a is not at the first position 3a (automatic pop-up position) (a mode in which a moving image is captured when the release button 9 is pressed).

The main capacitor 41 mounted on a lower portion of the strobe base 24 pre-charges the electrical load required for the strobe emission and supplies the emission energy to the lamp of the light emission unit 10.

Figures 6A, 6B:
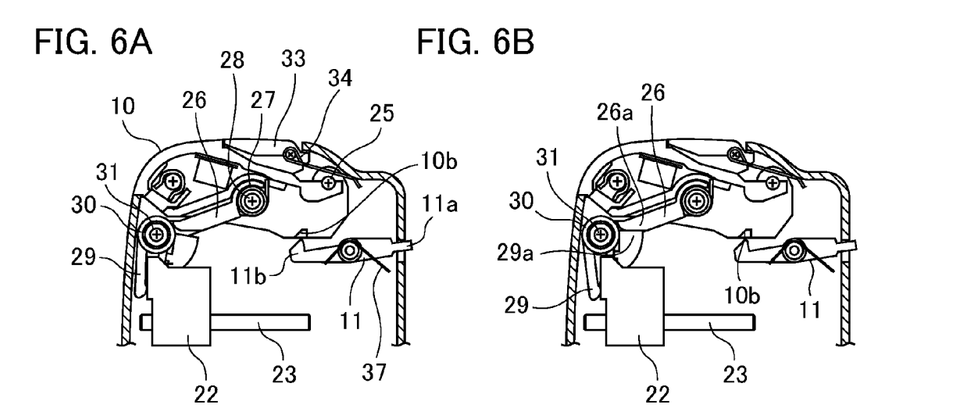
FIG. 6A to FIG. 6E illustrate the pop-up operation of a strobe during camera start-up.
Figures 6C, 6D:
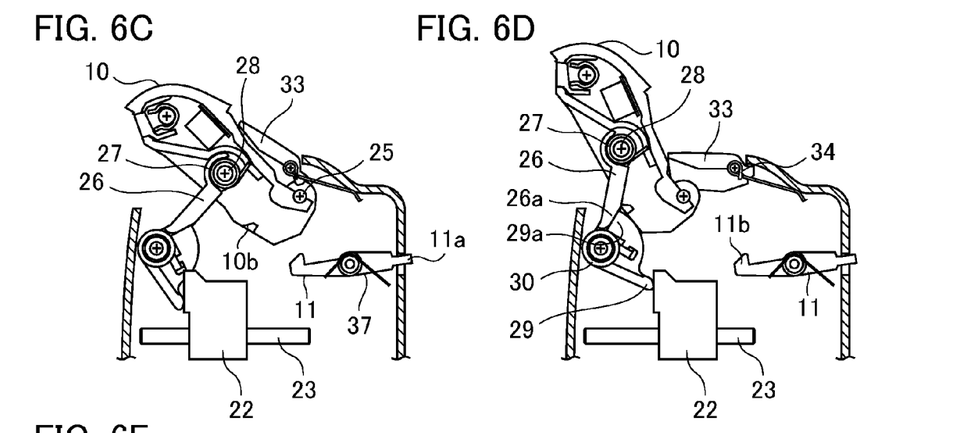

Next, the operation of the strobe unit 6 will be described. FIG. 6A and FIG. 6C illustrate respective states of the pop-up operation when the operation unit 11a of the lock lever 11 is set to the first position 3a (automatic pop-up position). The left of FIG. 6 corresponds to the front of the camera.

FIG. 6A illustrates a state in which the light emission unit 10 is stored in a storage unit 24a of the strobe base 24. At this time, the drive ring 17 is at the storage position, and the cam follower 22 moves to the left end position in the figure as described above, and presses the link lever 29 in a clockwise direction. The second spring 30 mounted on the link lever 29 rotates about the second shaft 31 to thereby press the link 26 in the clockwise direction. Since that force enables the link 26 to press the light emission unit 10 downwardly through the first shaft 28, the light emission unit 10 rotates in a counter-clockwise direction about the sliding shaft 25 and maintains a stored state. Furthermore, the light emission unit cover 33 rotates about the cover shaft 35 and is biased to close in a counter-clockwise direction by the force of the cover spring 34.

Figure 6E:
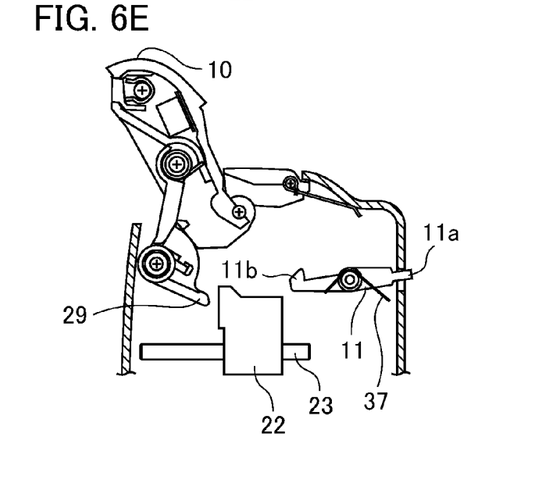

Next, when the camera is started up by an ON operation of the main switch 7, as illustrated in FIG. 6B, the cam follower 22 moves to the right of the figure along the guide shaft 23. At that time, the link lever 29 rotates in a counter-clockwise direction about the second shaft 31 due to the force of the second spring 30. In this manner, the stopper 29a of the link lever 29 abuts with the receiving surface 26a of the link 26, and thereafter, the link lever 29 does not rotate relative to the link 26, and the link lever 29 and the link 26 are engaged. When the cam follower 22 moves to the right, as illustrated in FIG. 6C, the link 26 is rotated by the force of the first spring 27 in a counter-clockwise direction relative to the light emission unit 10. In this manner, since the sliding shaft 25 is guided by the pair of guides 24b to move to the left, the overall light emission unit 10 starts to rise. At this time, the light emission unit cover 33 is pressed upward by the light emission unit 10 and opens by rotating in a clockwise direction. When the cam follower 22 moves to the right to reach the position in FIG. 6D, the light emission unit 10 undergoes further lifting, the light emission unit cover 33 closes by rotating in a counter-clockwise direction by the force of the cover spring 34. Furthermore, the state illustrated in FIG. 6E is obtained as a result of the cam follower 22 displacing to the right by a predetermined amount. The pop-up operation is completed by the production of a predetermined gap between the cam follower 22 and the link lever 29.

Next, the respective state when the operation unit 11a of the lock lever 11 is set to the second position 3b (manual pop-up down position) will be described making reference to FIG. 7A to FIG. 7E. The left direction in FIG. 7A corresponds to the front of the camera.

Figure 7A:
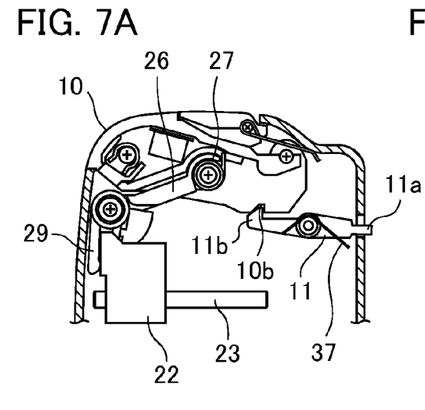
FIG. 7A to FIG. 7E illustrate maintaining the strobe in a storage state during camera start-up.
Figure 7B:
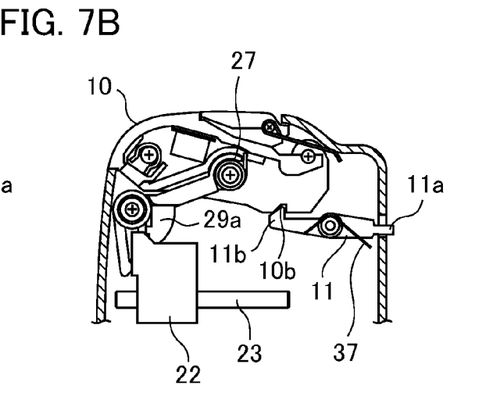
Figure 7C:
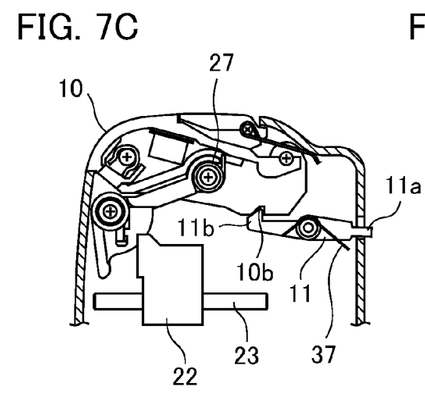
Figure 7D:
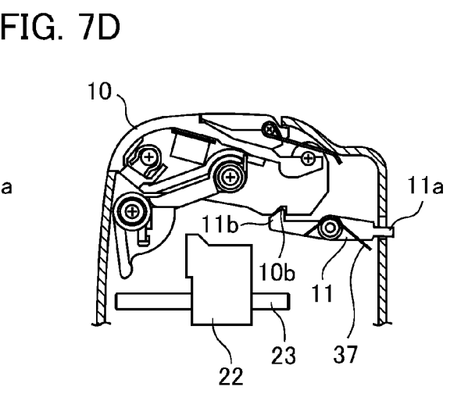

FIG. 7A illustrates the storage state of the light emission unit 10, and the storage state is maintained by downward pressure applied by the link 26 to the light emission unit 10. The hook portion 11b of the lock lever 11 is biased by the lock spring 37 and engages with the recessed portion 10b of the light emission unit 10 to thereby play the role of maintaining a storage state. In this state, when the camera is started up by an ON operation of the main switch 7, as illustrated in FIG. 7B, the cam follower 22 moves to the right. Although the light emission unit 10 tends to undergo a pop-up operation due to the force of the first spring 27, since the hook portion 11b remains engaged with the recessed portion 11b, lifting of the light emission unit 10 is impeded, and as illustrated in FIG. 7C, a pop-up operation is not executed. As a result, even when the cam follower 22 moves further to the right, passing through the state illustrated in FIG. 7D to move to the right end position in FIG. 7E, the light emission unit 10 remains in a storage state.

In this manner, when the operation unit 11a is in the manual pop-up down position, the light emission unit 10 remains stored in the storage unit 24a of the strobe base 24. In this state, when the user sets the operation unit 11a to the first position 3a (automatic pop-up position), the engagement between the hook portion 11b of the lock lever 11 and the recessed portion 10b of the light emission unit 10 is released. The link 26 is rotated relative to the light emission unit 10 by the force of the first spring 27, and thereafter, as described with reference to FIG. 6A to FIG. 6E, a pop-up operation is executed. That is to say, the lock lever 11 switches to a state in which the link member 29 is operably-linked to the cam follower 22 (functions as a switching member).

When the user wants to execute a pop-up operation of the strobe during imaging, as illustrated in FIG. 3C, the operation unit 11 of the lock lever 11 may be operated from the second position 3b (manual pop-up down position) to the third position 3c (manual pop-up up position). In this manner, since the hook portion 11b of the lock lever 11 that is caught on the recessed portion 10b of the light emission unit 10 is released, the link lever 29 is rotated by the force of the first spring 27, and as illustrated in FIG. 6E, the light emission unit 10 adopts a pop-up state. Thereafter, the user releases the operation unit 11a of the lock lever 11 and the lock lever 11 is returned to the second position 3b illustrated in FIG. 3B by the biasing force of the lock spring 37.

Next, the operation of the camera will be described.

When the main switch 7 is in OFF state

The cam follower 22 as illustrated in FIG. 6A and FIG. 7A is positioned moved to the left end, and the link lever 29 is pressed in a clockwise direction. As described above, the second spring 30 is designed to produce a stronger spring force than the first spring 27. Thus, the link 26 is pressed by the force of the second spring 30 and stores the resilient energy by compression of the first spring 27 to thereby maintain the light emission unit 10 in a depressed state. That is to say, since the link 26 is biased further in a storage direction in a state in which the light emission unit 10 is stored, the storage state of the light emission unit 10 is maintained irrespective of the state of the lock lever 11.

When main switch 7 is in ON state, and the operation unit 11 of the lock lever 11 is set to the first position 3a (automatic pop-up position)

As illustrated in FIG. 6B, the cam follower 22 moves to the right as the lens barrel unit 5 starts to protrude from a recessed state to a wide end state. Thereafter, as illustrated in FIG. 6C and FIG. 6D, the light emission unit 10 executes a pop-up operation. Then, as illustrated in FIG. 6E, when the cam follower 22 moves to a position that is separated by a predetermined amount from the link lever 29, the lens barrel unit 5 reaches the wide end position. In this manner, when the main switch 7 is placed in the ON state by the user with a setting in the automatic pop-up position, the light emission unit 10 moves automatically from the storage position to the pop-up position, and imaging operations using the strobe can be commenced.

When main switch 7 is in ON state, and the operation unit 11 of the lock lever 11 is set to the second position 3b (manual pop-up down position)

Since the recessed portion 10b of the light emission unit 10 is engaged with the hook portion 11b of the lock lever 11, as illustrated in FIG. 7A to FIG. 7E, even when the cam follower 22 moves to the right, the link lever 29 is not rotated by the force of the first spring 27, and the light emission unit 10 does not move. Even when the lens barrel unit 5 reaches a wide end position, the light emission unit 10 continues to remain at the storage position. In this manner, when the main switch 7 is placed in the ON state by the user with a setting in the manual pop-up down position, imaging operations can be commenced with the light emission unit 10 remaining in a stored state.

When "strobe linkage mode" is selected by use of the mode switching button 12, the camera starts up in an imaging mode corresponding to the setting position of the operating unit 11a when the main switch 7 is placed in the ON position, that is to say, in an imaging mode associated with an initial setting when the camera is started up. When "strobe linkage mode" has been selected by use of the mode switching button 12, the camera starts up in the still-image photography mode when in the automatic pop-up position, and the camera starts up in the moving-image photography mode when not in the automatic pop-up position. In this manner, since simple operation of the lock lever 11 by a user enables timely selection in relation to still-image photography that is often associated with use of a strobe or moving-image photography that does not require a strobe, the operation of the mode switching button 12 is not necessary.

When a user wants to use the strobe during imaging operations, as illustrated in FIG. 3, if the operation unit 11a of the lock lever 11 is moved to the third position 3c (manual pop-up up position), the hook portion 11b of the lock lever 11 as described above becomes separated from the recessed portion 10b of the light emission unit 10. Therefore, as illustrated in FIG. 6E, the light emission unit 10 undergoes a pop-up operation. Thereafter, when the operation unit 11a of the lock lever 11 is released, the operation unit 11a returns to the second position 3b (manual pop-up down position).

Figure 7E:
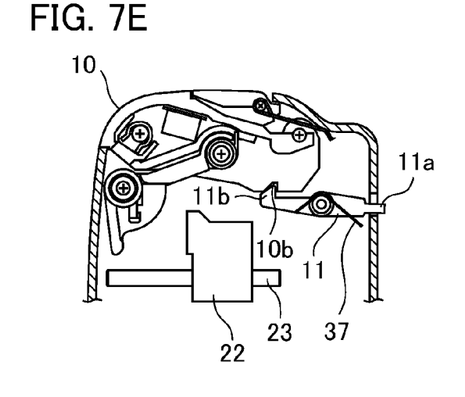

When the user wants to store the light emission unit 10 in the image apparatus main body 1, the light emission unit 10 is depressed manually from the state illustrated in FIG. 6E and moved to the storage position. As illustrated in FIG. 7E, the hook portion 11b of the lock lever 11 is engaged with the recessed portion 10b of the light emission unit 10 and thereby enables the light emission unit 10 to return again to the storage position.

When the main switch 7 is placed in the OFF position after completion of imaging, the cam follower 22 moves and starts to press on the link lever 29. The second spring 30 as described above is stronger than the first spring 27, and therefore the stopper 29a is maintained in a state of abutment on the receiving surface of the link 26 by the force of the second spring 30, and rotates integrally in a clockwise direction to thereby move the light emission unit 10 in a storage direction. Then the light emission unit 10 is stored. In other words, the lock lever 11 is switched to a state in which the link lever 29 is not operably linked with the cam follower 22.

In the present exemplary embodiment, the light emission unit 10 can be moved automatically from a pop-up position to a storage position by an operation force transmitted during storage operations from the cam follower 22 to the link lever 29. Furthermore, since the cam follower 22 moves to the position in FIG. 6A, the link 26 remains fixed and only the link lever 29 rotates in a counter-clockwise direction while charging the second spring 30. Therefore, since the link lever 29 can be biased in a storage direction when the light emission unit 10 is in a stored state, maintaining the storage state can be ensured. Furthermore, even if it is assumed that the operation unit 11a of the lock lever 11 was in the second position 3b (the manual pop-up down position), since the light emission unit 10 moves to a storage position as a result of the same action as that illustrated in FIG. 6, maintaining the storage state of the light emission unit 10 can be ensured.

The above configuration in the present exemplary embodiment uses a simple configuration to enable switching to a "required-only pop-up way" in an imaging apparatus that mounts a pop-up strobe that executes a pop-up operation in relation to a light emission unit by operable linkage with a protrusion operation of the lens barrel towards the front of the camera during startup. During startup in a moving-image photography mode that does not require a strobe, no impediment to imaging results since the light emission unit of the strobe does not undergo a pop-up operation. Furthermore, during startup in a still-image photography mode in which there is the possibility of use of the strobe, the possibility that a user will lose a photo opportunity is avoided since the light emission unit of the strobe undergoes an automatic pop-up operation.

That is to say, when the imaging apparatus according to the present exemplary embodiment changes from a state in which imaging is not enabled to a state in which imaging is enabled, the imaging apparatus can either automatically move the light emission unit to a pop-up position or maintain the light emission unit in a storage position.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-276193 filed Dec. 10, 2010 which is hereby incorporated by reference herein in its entirety.

What is claimed is:

1. An imaging apparatus having a light emission unit and a pop-up mechanism configured to move the light emission unit between a storage position at which the light emission unit is stored in the imaging apparatus body and a pop-up position in which the light emission unit protrudes from the imaging apparatus body, the imaging apparatus comprising:

the pop-up mechanism including:
a moving member configured to move when the imaging apparatus changes from an off state in which imaging is not enabled to an on state in which imaging is enabled; and
a switching member configured to switch a state of the light emission unit between a linked state in which the light emission unit links with the moving member and an unlinked state in which the light emission unit does not link with the moving member, wherein if the switching member switches the state of the light emission unit from the unlinked state to the linked state, the light emission unit moves from the storage position to the pop-up position linked with a moving of the moving member when the imaging apparatus is changed from the off state to the on state, wherein if the switching member switches the state of the light emission unit from the linked state to the unlinked state, the light emission unit is maintained at the storage position regardless of a moving of the moving member when the imaging apparatus changes from the off state to the on state, and wherein in a case when the image apparatus is in the on state in which the light emission unit is maintained at the storage position, and if the switching member switches the state of the light emission unit from the unlinked state to the linked state, the light emission unit moves from the storage position to the pop-up position without a moving of the moving member.

2. The imaging apparatus according to claim 1, wherein the switching member is an engaging member enabling engagement of the light emission unit when the light emission unit is positioned in the storage position, wherein in a case when the engaging member is engaged with the light emission unit, the state of the light emission unit changes to the unlinked state, and wherein in a case when the engaging member is not engaged with the light emission unit, the state of the light emission unit changes to the linked state.

3. The imaging apparatus according to claim 2, wherein in a case when the engaging member is positioned at a first position, the engaging member is not engaged with the light emission unit, wherein in a case when the engaging member is positioned at a second position, the engaging member is engaged with the light emission unit, wherein in a case when the engaging member is positioned at a third position, the engaging member is not engaged with the light emission unit; and wherein the pop-up mechanism has a biasing member that biases the engaging member to the second position when the engaging member is at the third position, wherein if the engaging member is positioned at the first position, and if the imaging apparatus changes from the off state to the on state, the light emission unit moves from the storage position to the pop-up position in response to a moving of the moving member, wherein if the engaging member is positioned at the second position, and if the imaging apparatus changes from the off state to the on state, the light emission unit is maintained at the storage position regardless of a moving of the moving member, and wherein the imaging apparatus is in the on state which the light emission unit is maintained at the storage position, and if the engaging member is displaced from the second position to the third position, the light emission unit moves from the storage position to the pop-up position regardless of a moving of the moving member.

4. The imaging apparatus according to claim 3, wherein in a case when the light emission unit is positioned at the pop-up position, and if the engaging member is positioned at the second position, the engagement member is engaged with the light emission unit whereby the light emission unit is moved to the storage position.

5. The imaging apparatus according to claim 3 further comprising: a detection unit for detecting a position of the engaging member and a mode switching unit enabling setting of a still-photography mode for capture of a still image or a moving-photography mode for capture of a moving image as a photography mode, wherein the mode switching unit switches the photography mode to the still-photography mode if the detection unit detects that the engaging member is at the first position when the imaging apparatus changes from the off state to the on state, and wherein the mode switching unit switches the photography mode to the moving-photography mode if the detection unit detects that the engaging member is at the second position.

* * * * *